United States Patent [19]
Li et al.

[11] Patent Number: 6,144,480
[45] Date of Patent: Nov. 7, 2000

[54] OPTICAL ARRANGEMENT FOR PROCESSING AN OPTICAL WAVE

[76] Inventors: Ming Li, Apartment 907, 981 Gulf Place, Ottawa, Ontario, Canada, K1K 3X9; Anders Larsson, Kvarnlyckan 14, S-427 34 Billdal, Sweden

[21] Appl. No.: 09/125,936

[22] PCT Filed: Feb. 27, 1997

[86] PCT No.: PCT/SE97/00343

§ 371 Date: Mar. 22, 1999

§ 102(e) Date: Mar. 22, 1999

[87] PCT Pub. No.: WO97/32243

PCT Pub. Date: Sep. 4, 1997

[30]     Foreign Application Priority Data

Feb. 28, 1996 [SE] Sweden .................................. 9600758

[51] Int. Cl.[7] .............................. G02F 1/01; G02F 1/03; G02F 1/295; G02B 5/18; G02B 6/34
[52] U.S. Cl. ...................... 359/279; 359/575; 359/254; 359/276; 359/319; 385/10; 385/37
[58] Field of Search ..................... 359/653, 654, 359/285, 286, 312, 569, 573, 575, 279, 276, 254, 319; 385/10, 37

[56]     References Cited

U.S. PATENT DOCUMENTS

| | | | |
|---|---|---|---|
| 4,806,454 | 2/1989 | Yoshida et al. | 430/321 |
| 4,960,311 | 10/1990 | Moss et al. | 359/9 |
| 5,315,423 | 5/1994 | Hong | 359/124 |
| 5,481,516 | 1/1996 | Kim | 369/44.12 |
| 5,574,597 | 11/1996 | Kataoka | 359/569 |
| 5,715,316 | 2/1998 | Steenblik et al. | 359/618 |
| 5,757,755 | 5/1998 | Nagano | 369/103 |
| 5,835,472 | 5/1994 | Horie et al. | 369/110 |

FOREIGN PATENT DOCUMENTS

| | | |
|---|---|---|
| 0 075 674 A2 | 4/1983 | European Pat. Off. . |
| 0 149 270 A2 | 7/1985 | European Pat. Off. . |
| 0 625 690 A1 | 11/1994 | European Pat. Off. . |
| 0 632 348 A1 | 1/1995 | European Pat. Off. . |
| 95/12149 A1 | 5/1995 | WIPO . |

OTHER PUBLICATIONS

Ming Li et al., "Multiplexed Computer–Generated Waveguide Hologram Using Gratings with Different Spatial Frequencies," IEEE Photonics Technology Letters, vol. 8, No. 12, Dec. 1996, pp. 1653–1655.

Ura et al., "Focusing grating for integrated optical–disk pickup device," The Transactions of IECE of Japan, Part C, vol. J68–C, No. 10, 1985, Oct., pp. 803–810 (in Japanese; not English).

T. Tamir et al., "Analysis and Design of Grating Couplers," Appl. Phys. 14, pp. 235–254 (1977).

Jyrki Saarinen et al., "Computer–generated guided–wave holography: application to beam splitting," Optics Letters, vol. 17, No. 4, Feb. 15, 1992, pp. 300–302.

Ming Li et al., "Optical Waveguide Fan–Out Elements Using Dislocated Gratings for Both Outcoupling and Phase Shifting," IEEE Photonics Technology Letters, vol. 8, No. 9, Sep. 1996, pp. 1199–1201.

*Primary Examiner*—Georgia Epps
*Assistant Examiner*—Evelyn A. Lester
*Attorney, Agent, or Firm*—Lerner, David, Littenberg, Krumholz & Mentlik, LLP

[57]     ABSTRACT

An optical arrangement comprising a plurality of cells arranged in a two-dimensional array on, into, or partly into an optical medium, each said cell having a pattern structure comprising a number of grooves which are parallel to each other and which form a grating. The grating of each cells forms at least two sections which are displaced in relation to each other by a predetermined distance in a direction which is essentially perpendicular to the longitudinal direction of the grooves. The grooves of two or more adjacent cells are unaligned with one another for controlling the phase or amplitude of one or more incident optical waves when the cells receive the incident optical waves.

47 Claims, 7 Drawing Sheets

OPTICAL ARRANGEMENT FOR PROCESSING AN OPTICAL WAVE

TECHNICAL FIELD

The present invention relates to an optical arrangement and a method for processing an optical wave according to the preamble of appended claims 1 and 26 respectively.

BACKGROUND OF THE INVENTION

In many applications it is required that a guided optical wave be efficiently radiated out of an optical waveguide, and be split into a number of optical beams and simultaneously be focused at finite distances away from the optical waveguide. Here the guided optical wave can be produced by a semiconductor diode laser. In an optical interconnection system, for example, it is not only essential to produce an array of spots with uniform intensity, but also necessary to focus most optical power into the desired spots in order to reduce power loss and to suppress spurious light. In short, such optical devices must simultaneously provide the following functions: (1) radiating the guided optical wave out of the optical waveguide; (2) splitting the radiated optical wave into a number of optical waves; and (3) focusing the radiated optical wave(s) at a finite distance away from the optical waveguide.

It is well-known that a uniform grating coupler, which is fabricated on the surface of or into an optical waveguide, can be used to achieve function (1) stated in the previous paragraph, viz., it has the ability to radiate a guided optical wave out of an optical waveguide. However, such a simple device lacks the beam-splitting and beam focusing functions. For example, refer to Tamir and Peng, Appl. Phys. 14, p. 235, 1977.

A focusing grating coupler has been proposed in, for example, Ura et al, "Focusing grating for integrated optical-disk pickup device". The Transactions of IECE of Japan, Part C, vol. J68-C, No. 10, October 1985, pp. 803–810. Instead of having periodically positioned, rectilinear grating grooves as in a uniform grating coupler, a focusing grating coupler comprises a group of curved grating grooves, each of which being uniquely defined by the interference fringes between a guided optical wave and a spherical free-space optical wave. Such a focusing grating coupler enables a guided optical wave to be radiated out of an optical waveguide and simultaneously to be focused into a single spot, i.e. it possesses functions (1) and (3). However, it is unable to split the radiated optical wave into a number of optical waves. In other words, a focusing grating coupler cannot simultaneously produce more than one focusing spot. This problem remains to be solved.

In some other applications, such as a computer-generated hologram for use in an optical phase-matched filter, it is generally advantageous to introduce a continuous level phase modulation to an incoming optical wave. so far, most efforts have been concentrated on achieving different phase levels by utilizing a surface-relief stop-like structure (FIG. 1), usually fabricated using a standard lithography and etching technique. As the number of required phase levels increases, so do the number of lithographic masks and the number of etching steps. This indicates that it is difficult and costly to fabricate computer-generated holograms with a larger number of phase levels, because each new mask must be precisely aligned with the previously etched pattern and the height of each step must also be accurately controlled in order to provide the desired phase shift. Therefore, it is beneficial to establish a method which is able to provide multi-level or even continuous level phase shifts using only two-level (or binary) surface-relief structures.

Also in the prior art is a computer-generated guided-wave holographic structure proposed by Saarinen et al. (see for example, Saarinen et al, "Computer-generated guided-wave holography; application to beam splitting", Optics Letters, Vol. 17, No. 4, Feb. 15, 1992). In this device, both the incoming optical wave and the output optical waves are confined with the optical waveguide. The proposed holographic structure comprises a two-level surface relief with a mathematically synthesized geometric shape extending along the surface of the optical waveguide. The phase modulation is achieved through effective refractive index modulation realized, e.g. by means of a patterned cover layer with the mathematically synthesized geometric shape. As a result, the phase shift is directly related to the product of the value of the effective refractive index modulation and the path length the guided optical wave travels through. Using the conventional fabrication technology, however, it is very difficult and often costly to accurately predict the effective refractive index modulation (see Saarinen et al, "Computer-generated guided-wave holography; application to beam splitting", Optics Letters, Vol. 17, No. 4, Feb. 15, 1992). Consequently, the resulting phase modulation may deviate from the desired value, thereby leading to degradation of the device performance. This problem remains to be solved.

Optical storage arrangements, e.g. holographic sheets which preferably have been computer-generated, are commonly used nowadays in several applications, for example in data storage, coherent laser beam addition, free-space interconnections, laser beam shaping, etc. According to the difference in signal encoding techniques, it is possible to categorize computer-generated holograms into two groups; amplitude-modulated holograms, and phase-modulated holograms. The phase-modulated hologram is usually preferable over the amplitude-modulated hologram, because the former can provide a higher diffraction efficiency. Binary phase holograms, i.e. two phase-level holograms, are relatively easy to fabricate, but their application is limited due to low diffraction efficiency. According to the scalar diffraction theory, binary phase holograms may have a theoretical maximum diffraction efficiency of 41%. In order to increase the diffraction efficiency, multilevel or continuous level phase-modulated holograms are often more desirable.

Moreover, according to the characteristics of the input and the output waves, computer-generated holograms can also be categorized into the following three groups: Free-space-to-free-space, guided-wave-to-guided-wave and guided-wave-to-free-space (or free-space-to-guided-wave). Each of these groups are shown as examples in FIGS. 1a–1c. FIG. 1a shows an example of a free-space computer-generated hologram FS-CGH, which belong to the group free-space-to-free-space, where no guided wave is involved. The arrows represent an optical wave which passes through the free-space computer-generated hologram and is projected on a screen. FIG. 1b shows an example of a in-plane computer-generated waveguide hologram IP-CGWH, which belongs to the group guided-wave-to-guided-wave. In the in-plane computer-generated hologram, both the input and the output waves are confined within an optical waveguide OW. The arrows represent an optical wave which passes through the in-plane computer-generated waveguide hologram and is projected in front of one edge of the hologram. FIG. 1c shows an example of an off-plane computer-generated waveguide hologram OP-CGWH, which belongs to the group guided-wave-to-free-space.

In the off-plane computer-generated hologram, both the input and the output waves are confined within an optical waveguide OW, and one of the involved waves may be inputted from or outputted to the free space. The arrows represent an optical wave which passes through the off-plane computer-generated waveguide hologram and is projected in free space.

Free-space computer-generated holograms have been most widely used in applications such as coherent laser beam addition, array generation, laser beam reshaping, etc. However, presently there is a lack of a generally applicable scheme which can be utilized to design and fabricate such holograms. The same problem as in free-space computer-generated hologram may occur for the other two types of holograms, i.e. in-plane and off-plane computer-generated waveguide holograms.

It is well-known that an optical storage arrangement may be composed of an array of rectangular cells which introduces amplitude and/or phase modulation to an incoming optical wave. Most efforts have been concentrated on achieving different phase levels by utilizing surface-relief step-like structures, usually fabricated using a standard lithography and etching technique. The number of achievable phase levels is usually equal to the number of surface-relief step levels. However, as the number of desired phase levels increases, so do the number of lithographic masks and the number of etching steps. This is both difficult and costly, e.g. when producing a hologram with a large number of phase levels, because each new mask should be precisely aligned with the previously etched pattern(s) and the height of each step must also be accurately controlled in order to provide the desired phase shift. Further, it is difficult to control the most commonly used etching techniques in a accurately manner. As a result, the shape and the depth of the relief can differ from its desired value, which can lead to a reduction of diffraction efficiency and/or poor repeatability of performance.

In addition, many optical storage arrangements are either amplitude-modulated or phase-modulated, which will restrict the design freedom of the arrangements. Further, it is very hard to simultaneously control the intensity and the phase of the diffraction space, thereby limiting the application of optical storage arrangements.

In some applications such as data storage, it is desirable to store a large number of images in a common volume of an optical storage arrangement, e.g. of a holographic material, in order to build up a desired storage capacity. An optical storage arrangement that contains more than one image is usually called "multiplexed". A multiplexed optical storage arrangement can be achieved, for example, (1) by directing the replaying optical beam at a particular angle, i.e. "angular multiplexing"; (2) using replaying beams with different spatial phase modulation, i.e. "phase code modulation", or (3) using replaying beams with different wavelength, i.e. "wavelength multiplexing". In case of multiplexing it may be difficult to replay the stored images independently, using guided waves incident from different locations, without introducing excessive crosstalk.

SUMMARY OF THE INVENTION

It is therefore an object of the present invention to provide an optical arrangement and a method for processing an optical signal in an optical arrangement, wherein an optical wave is modulated in phase and/or in amplitude so as to produce a desired optical wavefront or a desired optical intensity distribution, and overcomes the above-mentioned drawbacks.

This object is achieved by the arrangement and the method according to the present invention as defined in appended claims 1 and 26, respectively.

Another object of the present invention is to provide an optical waveguide device, wherein a guided optical wave is radiated out of an optical waveguide using a specially-designed grating coupler, and said grating coupler enables the radiated optical wave to be split into a number of optical waves and simultaneously it enables said optical waves to be focused at a finite distance away from said optical waveguide.

This object is achieved according to any one of claims 14, 15, 38 or 39.

It is a further object of the present invention to eliminate excessive crosstalk, when replaying several stored images, from an optical arrangement, independently.

Yet another object of the present invention is to provide an optical device, wherein a multi-level or a continuous-level phase modulation is invoked to an incoming optical wave by use of a two-level (or binary) surface-relief structure, and/or wherein an amplitude modulation is simultaneously invoked to said incoming optical wave by use of said surface-relief structure.

These objects is achieved according to any one of claims 7, 11, 16, 31, 35, or 40.

Advantageous embodiments of the arrangement and method are detailed in the respective dependent claims.

BRIEF DESCRIPTION OF THE DRAWINGS

The invention will now be described in detail in the following by way of example only and with reference to the attached drawings, in which

FIG. 3b shows a magnified view of the arrangement in FIG. 3a;

DETAILED DESCRIPTION OF PREFERRED EMBODIMENTS

Figure 1A:
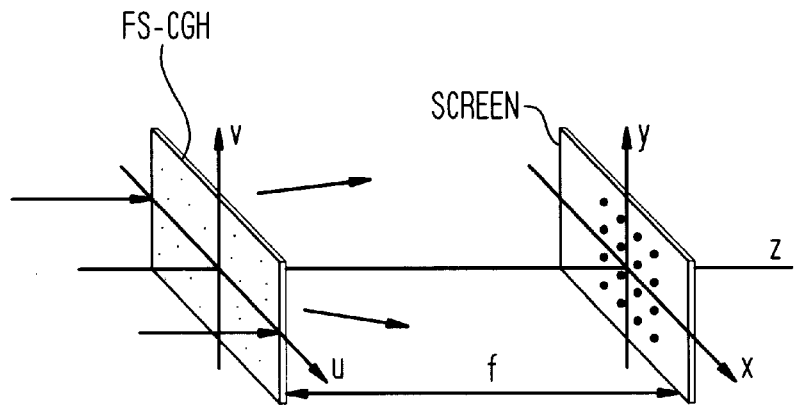
FIGS. 1a–c show different types of computer-generated holograms.
Figure 1B:
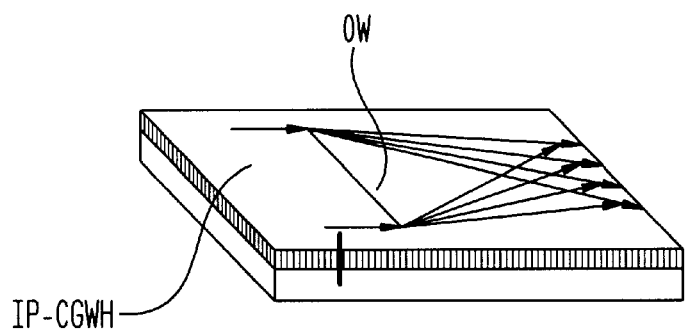
Figure 1C:
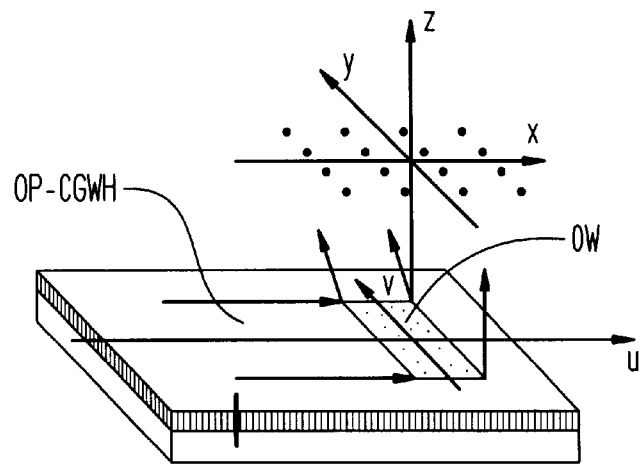
Figure 1D:
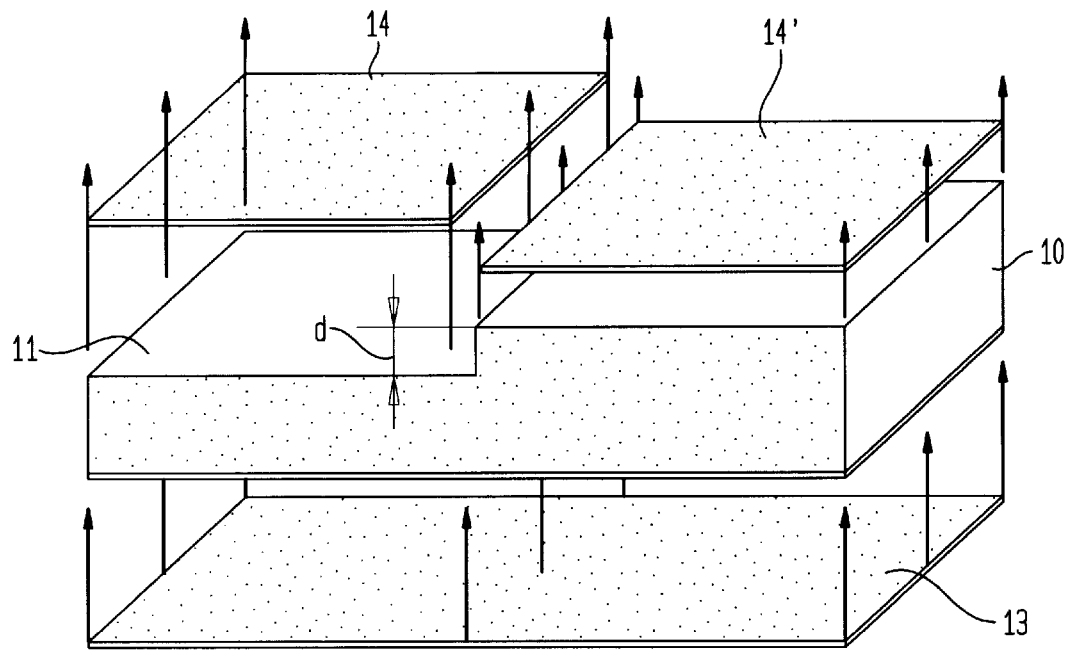
FIG. 1d shows a prior art scheme for introducing a phase modulation to an optical wave.

FIG. 1d is a prior art geometry for introducing a phase modulation to an optical wave. The geometry comprises a transparent optical substrate 10 and a surface-relief step-like structure 11 etched onto the substrate. Alternatively, the step-like structure may be replaced by a substantially flat surface but with an abrupt change in the substrate refractive index. According to the scalar diffraction theory, an incoming planar optical wave 13 traversing the optical substrate will be split into two planar optical waves 14 and 14' with a phase modulation δΦ between them described as $$\delta\Phi = 2\pi(n-1)d/\lambda$$

where n is the refractive index of the substrate material, d is the height of the surface-relief step 12, and l is the optical wavelength.

The arrangement according to FIG. 2 shows a first embodiment of an optical arrangement comprising a plurality of cells arranged on, into, or partly into an optical medium. The optical medium may comprise a sheet 10a, e.g. a holographic substrate, wherein each of the cells 20a,b having a pattern structure formed therein. The optical medium can be provided with a high-frequency binary, i.e. two-level, structure and the pattern structure in each of the cells 20a,b comprises a number of grooves 30a,b. The grooves 30a,b in at least one of the cells 20a,b are parallel to each other, and the grooves form a grating 40a,b. The grooves may have a width, which is smaller than or equal to one period in a periodic pattern defined by the grooves. The number of grooves in at least one of the cells is larger than zero.

The grating may be a diffraction grating. In turn, the diffraction grating may be a reflection grating, and/or the optical medium may be reflective. It is also possible that the optical medium is transparent, and/or the grating is a transmission grating.

The sheet can be made InGaAsP, which in turn has a substrate 260 of InP. Other compositions are also possible, e.g. a substrate of GaAs, with a sheet of AlGaAs.

Figure 2A:
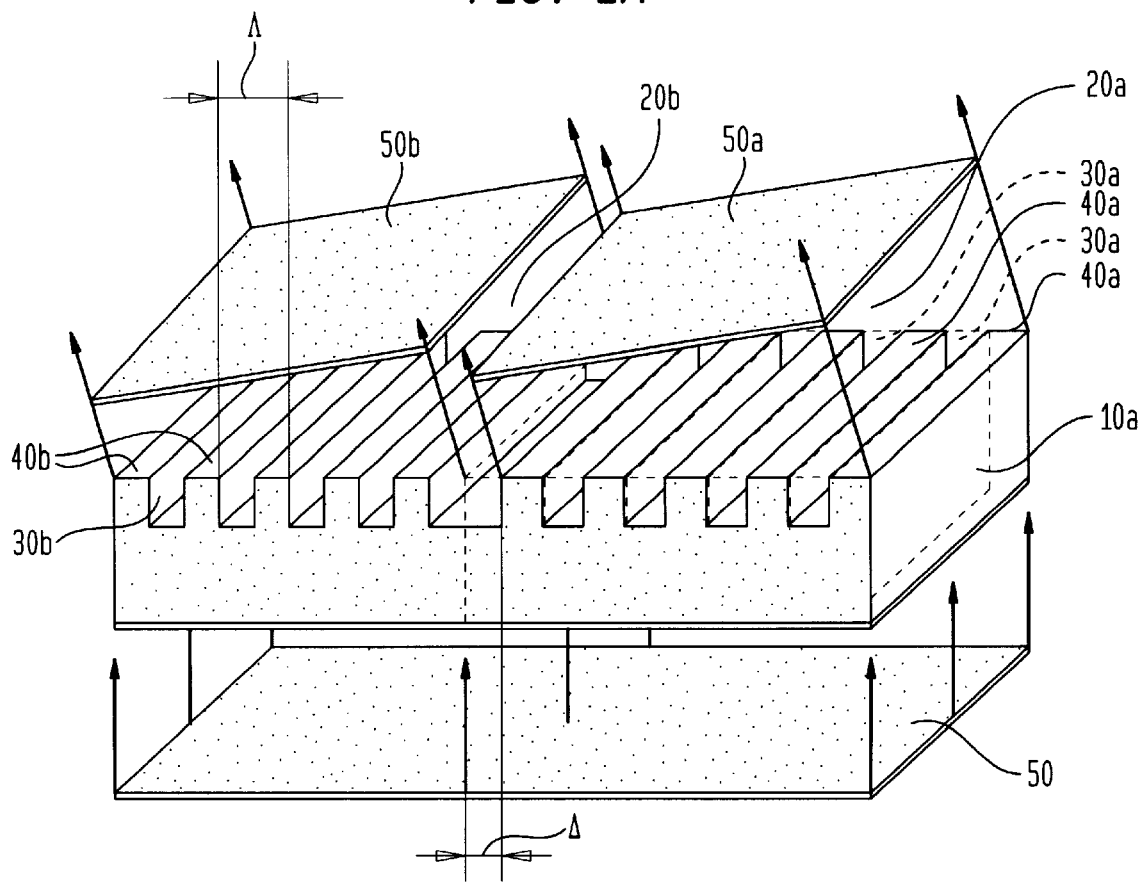
FIGS. 2a–c shows a first embodiment of an arrangement according to the present invention.
Figure 2B:
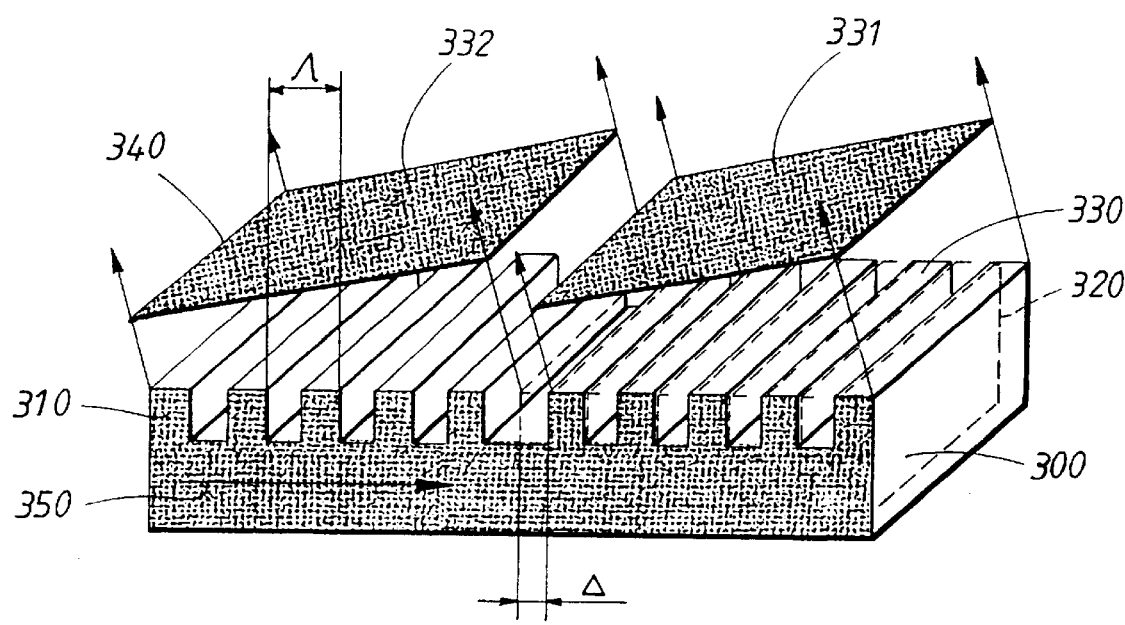
Figure 2C:
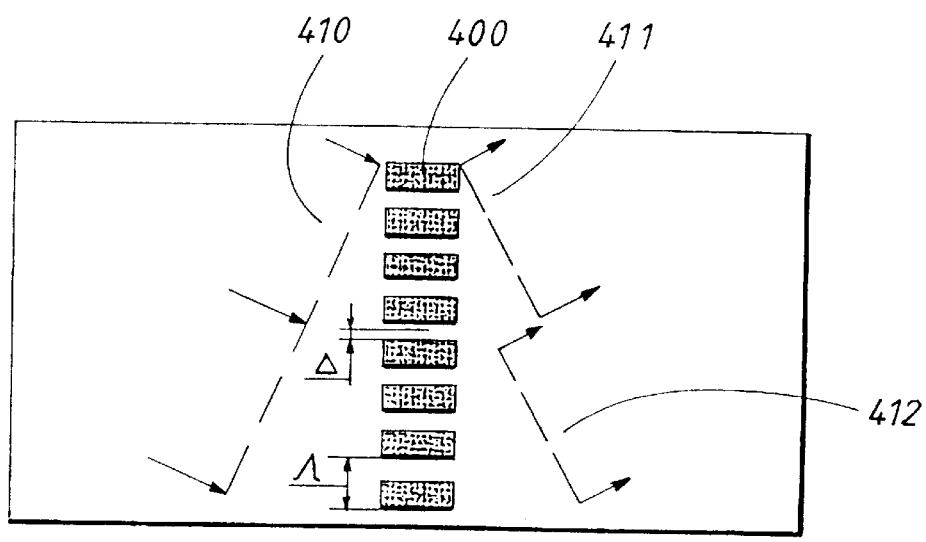

FIGS. 2a–c illustrate the geometries, according to the present invention, for introducing a phase modulation to an optical wave. In FIG. 2a, a periodic grating structure 40a, 40b containing plurality of grating grooves 30a, 30b, may be etched on, into, or partly into a transparent substrate 10a. When a planar optical wave passes through the substrate 10a, it is diffracted by the grating 40a, 40b producing a number of diffraction optical waves, each being represented by an integer m(=0,±1, ±2, ±3, . . . ) denoting the order of diffraction. For the sake of clarity, only one of the diffraction orders (with m=1) is shown in the diagram. Contrary to the conventional thinking as shown in FIG. 1d, where the desired phase modulation is introduced by spatially varying the thickness of the substrate, in our invention we use a completely different scheme for the same purpose. As illustrated in FIG. 2a, the diffraction grating 40a, 40b is splitted into two sections 40a and 40b, of which one section 40a is relatively displaced with the other section 40b by a distance Δ in the direction perpendicular to the grating grooves 30a, 30b. We have unexpectedly discovered that, as an optical wave passes through the substrate 10a, each of the diffraction waves is composed of two planar waves 50a and 50b with a phase difference $\Phi_A$ between them described as $$\Phi_A = 2m\pi\Delta/\Lambda$$

where m denotes the order of diffraction, and Λ represents the grating period. It is surprising that the phase modulation $\Phi_A$ is dependent on neither the optical wavelength nor the grating depth. In addition, since the phase modulation is only dependent on the lateral displacement Δ, it is therefore possible to introduce a multilevel or even continuous level phase modulation using only two-level (or binary) surface relief structure.

FIG. 2b illustrates an optical waveguide device 300 comprising an optical waveguide 310 grown on an optical substrate 320. A periodic grating structure 330, which is fabricated on the surface of or into the optical waveguide 310, couples the guided optical wave 340 with an external optical wave 350. For a uniform grating coupler 330, the waveguide grating coupler theory reveals that the near field of the external optical wave 350 has a planar wavefront with an amplitude exponentially decaying along the guided wave 340 propagation direction. This indicates that such a uniform grating coupler does not have beam shaping (e.g. focusing and splitting) capability. Although a focusing grating coupler can be used to radiate a guided optical wave out of an optical waveguide and simultaneously to focus the radiated wave into a single focusing spot, it does not have the beam splitting function, i.e. it cannot produce more than one focusing sports. In order to obtain these multiple functions, i.e. beam radiating, focusing and splitting, it is therefore essential to establish a mechanism which could be used to introduce phase modulation to a radiated optical wave. This problem has not been solved so far. In order to tackle this problem, we have therefore proposed a novel method which is illustrated in FIG. 2b. In FIG. 2b., the grating coupler 330 is splitted into two sections 331 and 332, of which one section 331 is relatively displaced with the other section 332 by a distance Δ in the direction perpendicular to the grating grooves 360. It is expected that both sections 331 and 332 will act independently as a grating coupler. However, we have unexpectedly discovered that the radiated optical waves (not shown), respectively radiated by 331 and 332, have a phase difference $\Phi_A$ between them described as $$\Phi_A = 2m\pi\Delta/\Lambda$$

where m denotes the order of diffraction, and Λ represents the grating period. It is surprising that the phase modulation $\Phi_A$ is dependent on neither the optical wavelength nor the grating depth. In addition, since the phase modulation is only dependent on the lateral displacement Δ, it is therefore possible to introduce a multilevel or even continuous level phase modulation using only two-level (or binary) surface relief structure.

FIG. 2c illustrates the schematic diagram of the geometry according to the present invention for introducing a phase modulation to a guided optical wave diffracted by a waveguide diffraction grating 400 with a period of Λ. The incoming optical wave 410 is also a guided optical wave propagating within the same optical waveguide. The outgoing waves are denoted by 411 and 412, respectively. A fraction of the waveguide diffraction grating is purposely displaced by a distance Δ along the surface of the substrate in the direction perpendicular to the grating grooves, in order to introduce the desired phase modulation. Only one of the diffraction orders is shown in the diagram.

This type of arrangement can be computer generated. It is well known how this type of arrangement can be produced, and therefore it will not be described in detail, see e.g. IEEE Photonics Technology Letters, Vol. 8, No. 9, p. 1199, 1996.

The cells 20 may be so arranged that the positions of said grooves 30 are relatively shifted laterally, i.e. the grooves are displaced between the cells, and/or the duty cycle of said gratings 40 is varied. For example, this can be achieved by means of a computer program which may generate the holographic structure. Thus, when the cells receives an incident optical wave 50, is it possible to control the phase and/or the amplitude modulation of the optical wave/s. In this case, the phase is controlled by the relative lateral shift of the binary grooves, whereas the amplitude modulation is obtained by varying the grating duty cycle, i.e. the toothwidth-to-period ratio.

The distance between one cell is denoted by Δ and the distance over the width of one grating 40 and one groove 30 is denoted by Λ. In this case the grooves define a periodic pattern, in which Δ also may be seen as a displacement between said cells and Λ may also be seen as a grating period. In case of a phase modulation, δθ, this will satisfies the condition $\delta\theta = 2\pi m\Delta/\Lambda$, m being the order of diffraction. The surface structure of the holographic sheet may have an arbitrary cross section. As an alternative, it is also possible to shift the grooves and/or the duty cycle of the gratings 40, by using a refractive-index modulation, whereas it is possible to use a sheet without a surface relief, i.e. in this case it is not necessary to use a sheet provided with a pattern structure.

By using this type of arrangement, it will be possible to obtain a general design tool for both in-plane and off-plane computer-generated waveguide holograms, because the positions of the grooves 30 may be relatively shifted laterally and/or the duty cycle of the gratings 40 can be shifted, to thereby control the phase and/or the amplitude of the optical wave when the holographic sheet receives an incident optical wave 50.

Further, this arrangement may have an optical waveguide device (not shown) for guiding an optical wave through the device, wherein the waveguide device comprises an optical waveguide having an optical axis. The sheet can be arranged on the surface or in the optical waveguide and couples a guided optical wave travelling in the optical waveguide with another guided optical wave travelling in the optical waveguide, or with an external optical wave. The optical wave can be generated by a light source, e.g. a semiconductor laser. It is also possible to use the grating as a waveguide grating coupler, to couple a guided optical wave travelling in the optical waveguide with an external optical wave.

Figure 3A:
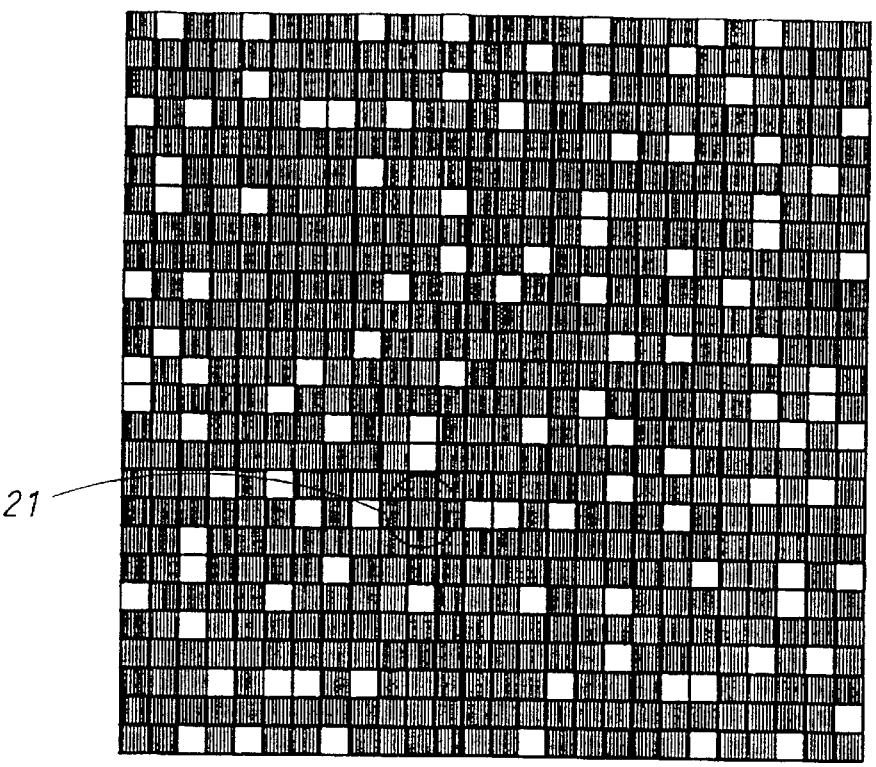
FIG. 3a shows a schematic diagram of the arrangement in FIG. 2.
Figure 3B:
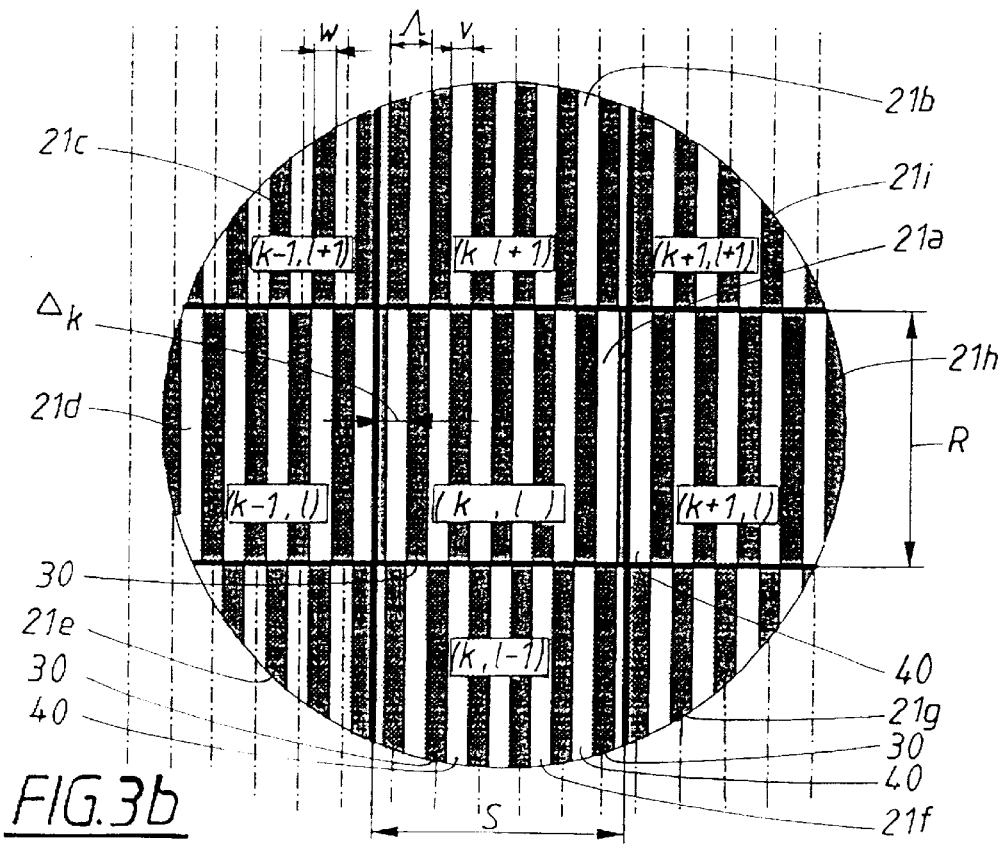

FIG. 3a and FIG. 3b show a schematic diagram of an array with M*N different cells 21a–21h, which may have a rectangular or square shape, corresponding to the cells 20 shown in the arrangement in FIG. 2. The different grey scales of the cells in FIG. 3a represent different phase levels. These different phase levels can be obtained by relatively shifting the positions of the grooves 30 within the sheet in the direction perpendicular to the grooves, i.e. laterally, to thereby control the phase of the optical signal, when the holographic sheet receives an incident optical signal. As an alternative, it is also possible to shift the grooves and/or the duty cycle of the gratings 40 by using a refractive-index modulation, whereas it is possible to use a sheet without a surface relief, i.e. it is not necessary to use a sheet provided with a pattern structure. This also means that it is not necessary to use a two-level structure, but a one-level or even more than a two-level structure may be used instead.

The cell marked as 21 in FIG. 3a is shown in a magnified view in FIG. 3b. The grating shift in one cell is denoted by $\Delta_k$ in FIG. 3b, and the distance over the width of one grating 40 and one groove 30 is denoted by $\Lambda$. The order of the cells is determined by k and l, wherein k and l denote an integer, respectively. R represents the height of one cell 21a, and S represents the width of the same cell 21a. The width of one groove 30 is denoted by W, and the width of one grating tooth 40 is denoted by V.

Referring to FIGS. 1a–c, the geometric structure of the optical devices can be as described in FIG. 3a and FIG. 3b. FIG. 1a shows an example of a free-space computer-generated hologram FS-CGH, which belong to the group free-space-to-free-space, where no guided wave is involved, and makes it possible to obtain for instance an optical device which produces a uniform intensity distribution. Thus, it is possible for the optical element to receive an optical wave in free-space and transmit said optical wave into free-space. FIG. 1b shows an example of a in-plane computer-generated waveguide hologram IP-CGWH, which belongs to the group guided-wave-to-guided-wave, which can be used as an optical waveguide device. In this case, for instance one or several guided optical waves emitted by one or several laser diodes are coupled, by a waveguide diffraction grating, with a number of other guided optical waves. Simultaneously, said guided optical waves are focused by said waveguide diffraction. Thus, the optical element may receive an guided optical wave in one plane and transmit said guided optical wave in the same plane. FIG. 1c shows an example of an off-plane computer-generated waveguide hologram OP-CGWH, which belongs to the group guided-wave-to-free-space. In this example the device can be used as an optical waveguide device. Thus, the optical element may receive an guided optical wave in one plane and transmit said optical wave from said plane into free-space, or receives an optical wave from free-space to one plane and transmit said optical wave in the same plane.

With the type of pattern structure shown in FIG. 2 and FIG. 3, it is possible to obtain a multilevel or even continuous level phase and amplitude modulation by using a binary, i.e. two-level, surface-relief grating. Further, difficulties in mask alignment and etch depth control can be overcome by using only one lithography and one etch step.

Figure 4A:
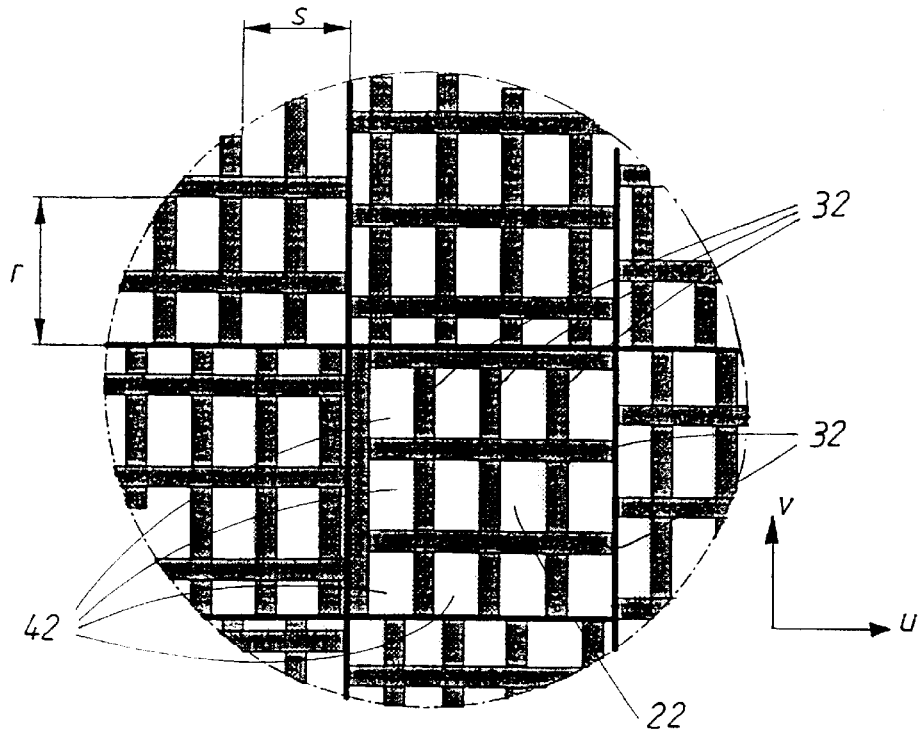
FIG. 4a shows a schematic diagram of a second embodiment of an arrangement according to the present invention.

In FIG. 4a a second embodiment of the present invention is shown, wherein the cells 22 can be arranged in a first u and a second v plane with the gratings by a superposition of the planes u,v, which form two-dimensional gratings 42, wherein grooves in the first plane u are substantially orthogonal to grooves in the second plane v. This can be used for example in angular multiplexing. It also possible to have further planes. The plurality of grooves in both the first and the second planes define a periodic pattern consisting of grating grooves 32, with the periodic pattern having a grating period r,s. This two-dimensional grating is capable of outcoupling guided waves incident from the u and v direction, either simultaneously or separately. In order to minimize crosstalk, the grating periods in both the u and v directions must be properly chosen, such that the grating component with grooves parallel to the u (or v) direction acts as a zeroth-order grating for a guided wave incident along the u (or v) direction. In other words, the grating periods in both directions are small enough so that there is non-zeroth order diffraction within a waveguide. The phase shifts, introduced by a cell in both u and v directions, can be determined by the magnitudes of the dislocations of the grating components in u and v direction, respectively. The orientation of the grooves 32 in one cell 22, 23 may be arbitrary with respect to the orientation of the grooves 30 in an adjacent cell 22, 23.

Figure 4B:
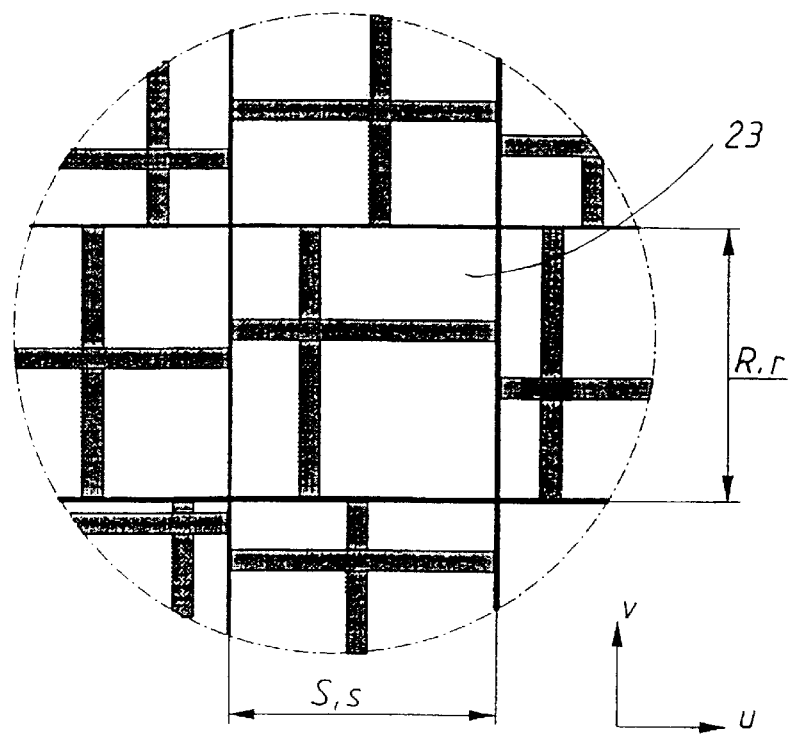
FIG. 4b shows a schematic diagram of a third embodiment of an arrangement according to the present invention.
Figure 5:
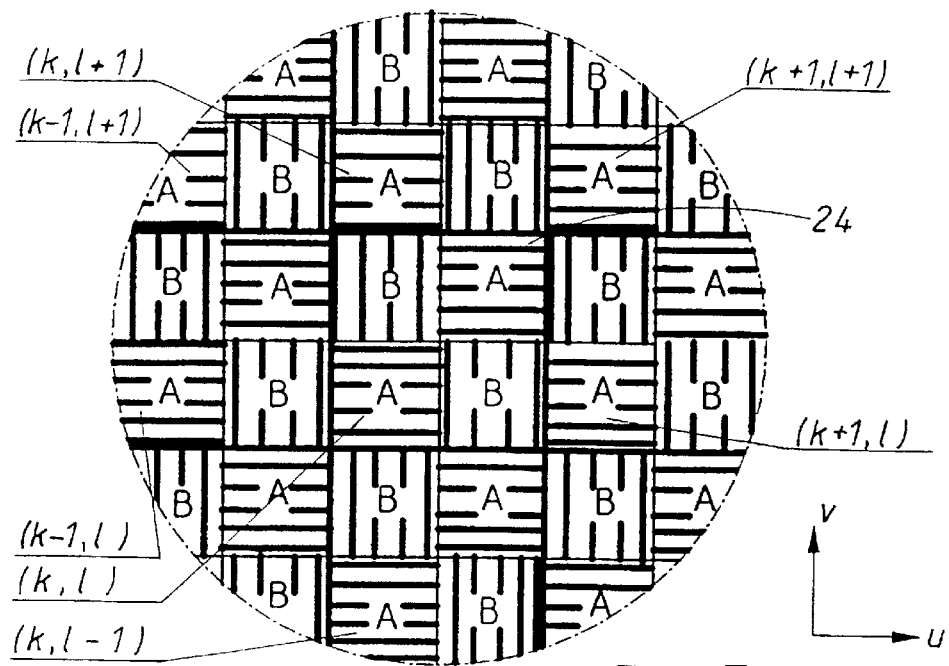
FIG. 5 shows a schematic diagram of a fourth embodiment of an arrangement according to the present invention.

FIG. 4b shows a third embodiment of the present invention, which is a special case of the arrangement shown in FIG. 4a, where each cell 23 has substantially the same dimensions in height R and width S in the cell 23 as the grating periods r,s, or that the grating periods r,s in the first and second plane are so small that there is no non-zeroth order diffraction within an optical waveguide FIG. 5 shows a fourth embodiment according to the present invention, the cells are divided into subcells 24, in which each of the subcells may comprise a separate part of a hologram A,B, wherein a relating part of the hologram is positioned in a subcell of another cell 24. It is also possible to choose an arbitrary orientation of the grooves 30 in one subcell 24 with respect to the orientation of the grooves 30 in an adjacent subcell 24. In FIG. 5 it can be seen that a cell 24 is arranged in one plane, e.g. in a waveguide hologram, in which the grooves in one sub-cell 24 are substantially orthogonal to grooves in an adjacent sub-cell 24. In this geometry, each sub-cell 24 may contain an outcoupling and/or incoupling grating with a certain groove orientation and a certain period. Thus, these sub-cells 24 can outcouple and/or incouple a guided wave incident from the u and v direction, respectively. Alternatively, the structure shown in FIG. 5 can also be considered to consist of two interlaced sub-arrays of cells with orthogonal grooves. Each sub-array acts independently as a waveguide sub-hologram. In addition, the images stored in these two sub-holograms can be independently reconstructed by using a guided wave that propagates in either the +u or the +v direction.

It is well known how this type of arrangement can be produced, and therefore it will not be described in detail, see e.g. IEEE Photonics Technology Letters, Vol. 8, No. 12, p. 1653, 1996.

Figure 6:
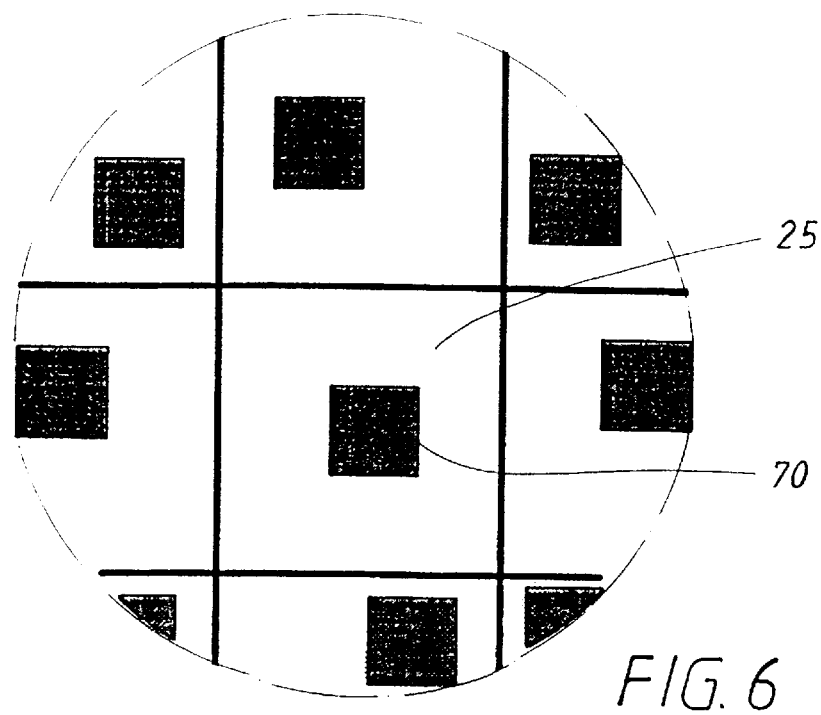
FIG. 6 shows a schematic diagram of a fifth embodiment of an arrangement according to the present invention.

Referring to FIG. 6, a fifth embodiment of the present invention is shown where a two-dimensional array of cells 25 in an optical medium as described above may be provided by a first and a second array of cells, wherein grooves in the first array are arranged on or above grooves in the second array so that one cell forms a distribution of one or several blocks 70. In this geometry, these blocks 70 form scattering centres which can be of an arbitrary shape. The phase modulation of each rectangular cell 25 is determined by the position of the blocks within that cell. The blocks 70 are preferably quadratic. The two-dimensional array shown in FIG. 6 has a periodic pattern having an block period, wherein each cell 25 has substantially the same dimensions in length and/or width as the block periods. This minimizes the total hologram size for a given number of cells. Within each cell there is one square block 70, and the position of the square centre determines the phase level of the cell 25. Naturally, each cell can have more than one block, but then the hologram size will also increase.

Figure 7A:
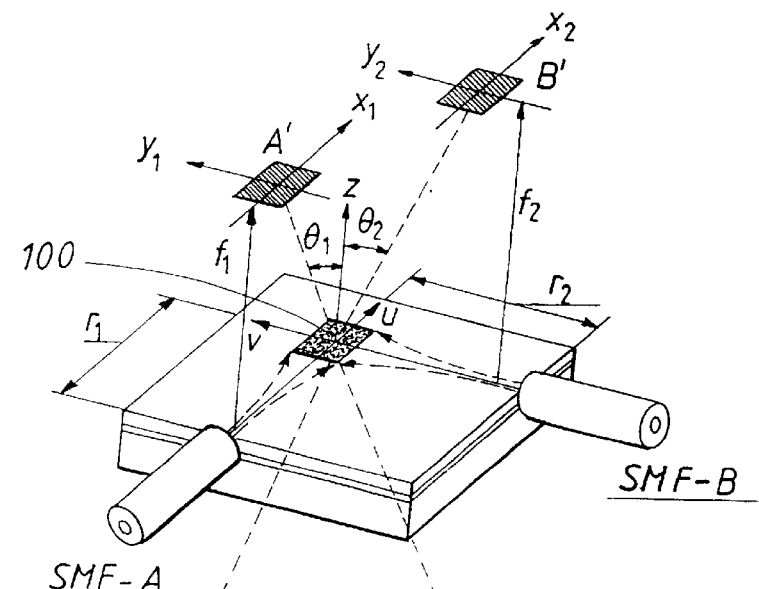
FIGS. 7a–b show examples of applications for an arrangement according to the present invention.
Figure 7A:
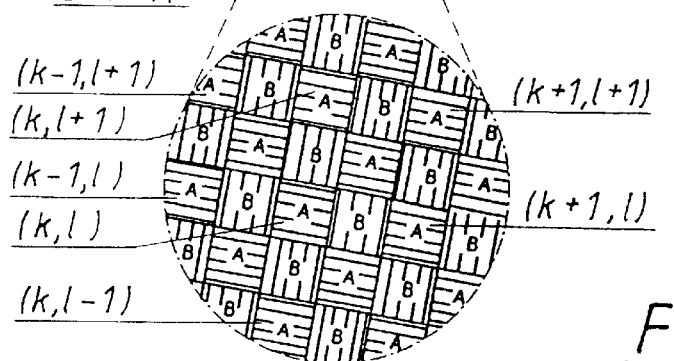

FIG. 7a shows a first application of the arrangement according to the present invention, wherein two single mode fibres SMF-A and SMF-B direct two different optical signals, in the +u and +v direction respectively, into an arrangement 200 shown in FIG. 5. When the signals pass through the arrangement 100, the images A', B' stored in these two subholograms A,B, described in FIG. 5, can be independently reconstructed by using two guided waves that propagate in the +u and +v direction. This embodiment can be used e.g. as an angularly multiplexed waveguide hologram. The radiation angles are denoted by $\theta_1$ and $\theta_2$. The focal length for the image presented in the sub-cells A and B is denoted by $f_1$ and $f_2$, respectively.

It is well known how this type of arrangement can be produced, and therefore it will not be described in detail, see e.g. IEEE Photonics Technology Letters, Vol. 8, No. 12, p. 1653, 1996.

Figure 7B:
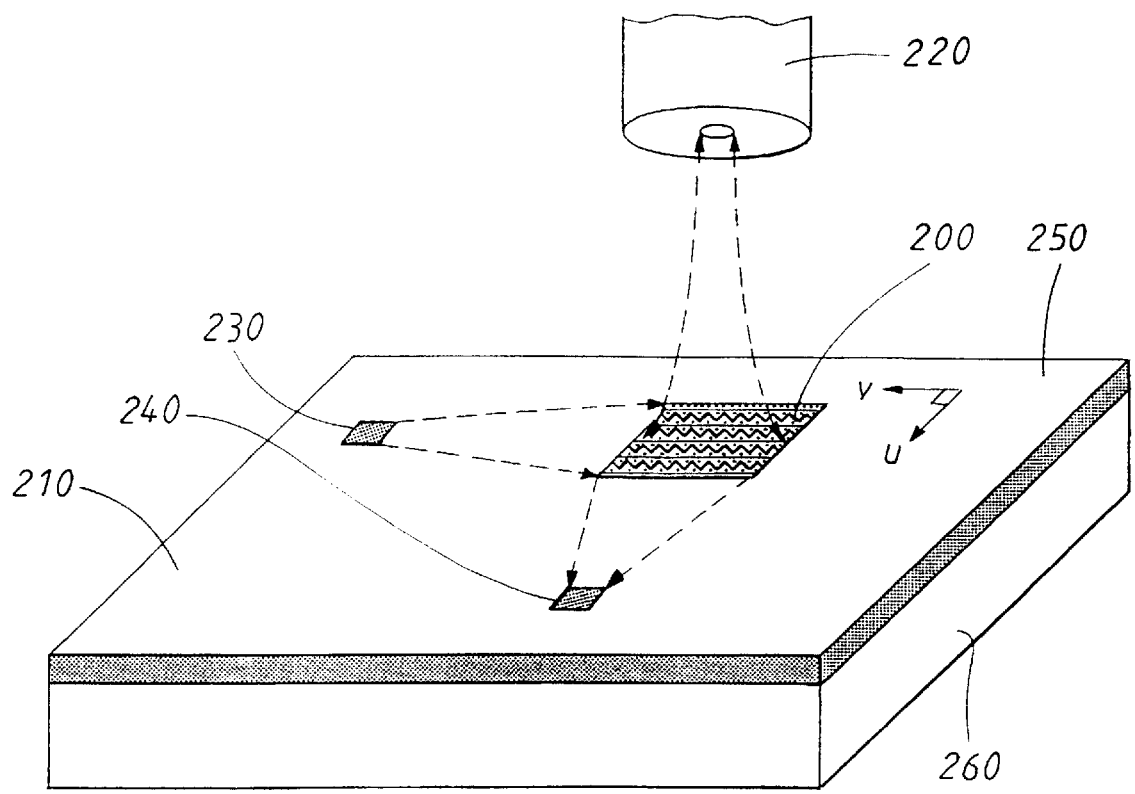

Referring to FIG. 7b a second application of the arrangement according to the present invention is shown in which the arrangement 200 is arranged in a transmitter/receiver chip 210 which can transmit an optical signal from a light source (not shown) through the arrangement 200 into an optical receiver 220 and can simultaneously receive an optical signal through the arrangement from the optical receiver. This optical receiver may be e.g. an optical fibre. The arrangement can e.g. comprise of one of the embodiments described in FIGS. 4–6. The receiver is denoted by 240, and the transmitter is denoted by 230. By using this type of arrangement it will be possible to avoid excessive crosstalk, if the grating periods in both the u and v directions are properly chosen, such that the grating component with grooves parallel to the u (or v) direction, see e.g. FIG. 4a, acts as a zeroth-order grating for a guided wave incident along the u (or v) direction. In other words, the grating periods in both directions are small enough so that there is non-zeroth order diffraction within a waveguide. The arrangement can further be arranged on a optical sheet 250 of e.g. InGaAsP, which in turn has a substrate 260 of InP. Other compositions are possible, e.g. a substrate of GaAs, with a sheet of AlGaAs.

A third application of the arrangement according to the present invention, not shown, wherein the arrangement is arranged in a wavelength multiplexer, which transmits optical signals from light sources through the arrangement into an optical medium. This optical receiver may be e.g. an optical fibre. It is also possible that the arrangement be arranged in a wavelength demultiplexer, which receives optical signals through the arrangement from an optical medium.

A fourth application of the arrangement according to the present invention, not shown, wherein the arrangement is arranged in a tap power divider, which couples an optical signal from an optical medium through the arrangement into an optical waveguide, and divides the signal into different directions. This optical medium may be e.g. an optical fibre.

A fifth application of the arrangement according to the present invention, not shown, wherein the arrangement is arranged in an optical polarization analyzer, which couples an optical signal with an arbitrary polarization through the arrangement into an optical waveguide, and simultaneously directs different polarization components in different directions.

A sixth application of the arrangement according to the present invention, not shown, wherein the arrangement is arranged in a polarization-independent optical receiver, which through the arrangement detects an optical signal from an optical medium with an arbitrary polarization. This optical medium may be e.g. an optical fibre.

In the embodiments described in FIGS. 4–7 the optical waves are emitted by one or several light sources, e.g. by a semiconductor lasers, and the optical waves may be radiated out of an optical waveguide by the grating and so that the optical waves may couple with an external optical wave. Further, the external optical wave may be coupled into the optical waveguide by the grating to produce these optical waves, and wherein the optical waves can be detected by photodetectors which transforms the optical waves into electrical signals.

The invention is not limited to the embodiments described above and shown in the drawings, but can be varied within the scope of the appended claims. For example, another advantageous possibility which the embodiments in FIGS. 4–7 provides is to couple out a first optical wave emitted by a lightsource, preferably a laser, from an optical waveguide by the grating, when the first and a second optical wave propagates in directions, which are substantially perpendicular to each other. This first optical wave may then produce an outgoing external signal. An incoming external optical wave is coupled into the optical waveguide by the grating, in order to produce the second optical wave, and wherein the second optical wave is intercepted by a photodetector which is able to transform the optical wave into an electronic signal.

What is claimed is:

1. An optical arrangement, comprising a plurality of cells arranged in a two dimensional array on, into, or partly into an optical medium, each said cell having a pattern structure comprising a number of grooves which are parallel to each other and which form a grating wherein said grating of each said cell forms at least two sections which are displaced in relation to each other by a predetermined distance in a direction which is essentially perpendicular to the longitudinal direction of said grooves, wherein the grooves of two or more adjacent cells are not in alignment with one another to control the phase or amplitude of one or more optical waves, when said cells receive one or more incident optical waves.

2. Optical arrangement according to claim 1, wherein said distance between said sections extends along a direction which is essentially perpendicular to the direction of said incident optical wave.

3. Optical arrangement according to claim 1 or 2, wherein said cells are arranged in an M*N array.

4. Optical arrangement according to claim 3, wherein said grooves define a periodic pattern, said periodic pattern having said displacement between said cells and a grating period which in case of a phase modulation, $\delta\theta$, satisfies the condition $\delta\theta=2\pi m\Delta/\Lambda$, m being the order of diffraction.

5. Optical arrangement according to claim 3, said grooves having a width, which is smaller than or equal to one period in said periodic pattern.

6. Optical arrangement according to claim 3, wherein a first and a second plane with said gratings are arranged by a superposition of said planes, to form two-dimensional gratings.

7. Optical arrangement according to claim 6, that said planes are superpositioned by further planes.

8. Optical arrangement according to claim 6, wherein the plurality of grooves in both said first and said second planes define a periodic pattern, said periodic pattern having a grating period, and in that each cell has substantially the same dimensions in width and/or height as said grating periods, or that said grating periods in said first and second plane are so small that there is no non-zeroth order diffraction within an optical wave guide.

9. Optical arrangement according to claim 6, wherein the orientation of the grooves in one cell is arbitrary with respect to the orientation of the grooves in an adjacent cell.

10. Optical arrangement according to claim 1 wherein said cells are divided into subcells, in which each of said subcells comprises a separate part of a hologram, wherein a relating part of the hologram in positioned in a subcell of another cell.

11. Optical arrangement according to claim 10, wherein the orientation of the grooves in one subcell is arbitrary with respect to the orientation of the grooves in an adjacent subcell.

12. Optical arrangement according to claim 1, wherein each of said cells has a rectangular or a square shape.

13. Optical arrangement according to claim 1, wherein said optical medium has an optical waveguide device for guiding an optical wave therethrough, wherein said waveguide device comprises an optical waveguide having an optical axis.

14. Optical arrangement according to claim 13, wherein said grating is a waveguide grating coupler, to couple a guided optical wave travelling in said optical waveguide with an external optical wave.

15. Optical arrangement according to claim 1, wherein a two-dimensional array of cells in said optical medium is provided by a first and a second array of cells, wherein grooves in said first array are arranged on or above grooves in said second array so that one cell forms a distribution of one or several blocks.

16. Optical arrangement according to claim 15, wherein said two-dimensional array having a periodic pattern of blocks, wherein each cell has substantially the same dimensions in length and/or width as said block periods.

17. Use of optical arrangement according to claim 6 in a transmitter/receiver chip which transmits an optical signal from a light source through said arrangement into an optical receiver, preferably an optical fibre, and simultaneously receives an optical signal through said arrangement from said optical receiver.

18. Use of an optical arrangement according to claim 6 in a wavelength multiplexer which transmits optical signals from one or several light sources through said arrangement into an optical receiver, preferably an optical fibre, and/or that said arrangement is arranged in a wavelength demultiplexer, which receives optical signals through said arrangement from an optical receiver.

19. Use of an optical arrangement according to claim 6 in a tap power divider which couples an optical signal from an optical receiver, preferably an optical fibre, through said arrangement into an optical waveguide, and divides the signal in different directions.

20. Use of an optical arrangement according to claim 6 in an optical polarization analyzer which couples an optical signal with an arbitrary polarization through said arrangement into an optical waveguide, and simultaneously directs different polarization components in different directions.

21. Use of an optical arrangement according to claim 6 in a polarization-independent optical receiver, which through said arrangement detects an optical signal from an optical receiver, preferably an optical fibre, with an arbitrary polarization.

22. Optical arrangement according to claim 1, wherein said grating is a diffraction grating.

23. Optical arrangement according to claim 22, wherein said diffraction grating is a reflection grating, and/or said optical medium is reflective.

24. Optical arrangement according to claim 1, wherein said optical medium is transparent, and/or said grating is a transmission grating.

25. Optical arrangement according to claim 1, wherein said pattern structure has two levels.

26. A method for processing an optical wave by means of an optical element provided with a plurality of cells arranged in a two-dimensional array, said cells being provided with a pattern structure formed therein said pattern structure in each of said cells being provided with a number of grooves which are parallel to each other and which form a grating, wherein said grating forms at least two sections which are displaced in relation to each other by a predetermined distance in a direction which is essentially perpendicular to the longitudinal direction of said grooves, whereby the positions of said grooves are displaced between the cells and/or that the duty cycle of said gratings is varied so that when said cells receive an incident optical wave, the phase and/or the amplitude of said optical wave is thereby controlled by said element.

27. A method according to claim 26, wherein said pattern structure causes refractive-index modulation.

28. A method according to claim 26 or 27, wherein said grooves define a periodic pattern, said periodic pattern are displaced between said cells and a grating period, wherein in case of a phase modulation, $\delta\theta$, satisfies the condition $\delta\theta=2\pi m\ \Delta/\Lambda$, m being the order of diffraction.

29. A method according to claim 26, wherein said cells have a surface structure with an arbitrary cross section.

30. A method according to claim 26, wherein a first and a second plane with said gratings are provided by a superposition of said planes, which form two-dimensional gratings.

31. A method according to claim 30, wherein said planes are superpositioned by further planes.

32. A method according to claim 30, wherein the plurality of grooves in both said first and said second planes define a periodic pattern, said periodic pattern having a grating period, and in that each cell has substantially the same dimensions in width and/or height as said grating periods, or that said grating periods in said first and second plane are so small that there is no non-zeroth order diffraction within an optical waveguide.

33. A method according to claim 30, wherein the orientation of the grooves in one cell is arbitrary with respect to the orientation of the grooves in an adjacent cell.

34. A method according to claim 26, wherein said cells are divided into subcells, in which each of said subcells forms a separate part of a hologram, wherein a relating part of the hologram is positioned in a subcell of another cell.

35. A method according to claim 34, wherein the orientation of the grooves in one subcell is arbitrarily selected with respect to the orientation of the grooves in an adjacent subcell.

36. A method according to claim 26, wherein each of said cells is rectangularly or quadratically shaped.

37. A method according to claim 26, wherein said optical element is provided with an optical waveguide device. comprising an optical waveguide with an optical axis, which guides said optical wave therethrough.

38. A method according to claim 37, wherein said grating forms a waveguide grating coupler, to couple a guided optical wave travelling in said optical waveguide with an external optical wave.

39. A method according to claim 26, wherein a two-dimensional array of cells in said optical medium is provided by a first and a second array of cells, wherein grooves in said first array are placed on or above grooves in said second array so that one cell forms a distribution of one or several blocks.

40. A method according to claim 39, wherein said two-dimensional array has a periodic pattern, which forms a block period, wherein each cell has substantially the same dimensions in length and/or width as said block periods.

41. A method according to claim 30 or 39, wherein said optical waves are emitted by a light source, preferably a laser, and wherein said optical waves are radiated out of an optical waveguide by said grating and said optical waves couple with an external optical wave.

42. A method according to claim 41, wherein said external optical wave is coupled into said optical waveguide by said grating to produce said optical waves, and wherein said optical waves are detected by photodetectors which transforms said optical waves into electrical signals.

43. A method according to claim 30 or 39, wherein a first and a second optical wave propagates in directions which are substantially perpendicular to each other, and wherein said first optical wave is emitted by a lightsource, preferably a laser, and it is coupled out ot an optical waveguide by said grating which produces an outgoing external signal, and wherein an incoming external optical wave is coupled into said optical waveguide by said grating producing said second optical wave, and wherein said second optical wave is intercepted by a photodetector which transforms the optical wave into an electronic signal.

44. A method according to claim 26, wherein said optical element receives an optical wave in free-space and transmits said optical wave into free-space.

45. A method according to claim 26, wherein said optical element receives a guided optical wave in one plane and transmits said guided optical wave in the same plane.

46. A method according to claim 26, wherein said optical element receives a guided optical wave in one plane and transmits said optical wave from said plane into free-space.

47. A method according to claim 26, wherein said optical element receives a guided optical wave from free space in one plane and transmits said optical wave in the one plane.

* * * * *

UNITED STATES PATENT AND TRADEMARK OFFICE
CERTIFICATE OF CORRECTION

PATENT NO. : 6,144,480
DATED : November 7, 2000
INVENTOR(S) : Li et al.

It is certified that error appears in the above-identified patent and that said Letters Patent is hereby corrected as shown below:

Column 10, line 9, after "multiplexer,", delete "which".
Column 10, line 18, after "divider,", delete "which".
Column 10, line 24, after "analyzer,", delete "which".
Column 10, line 32, delete "which through the arrangement".
Column 10, line 36, after "by", delete "a".
Column 10, line 43, "transforms" should read --transform--.
Column 11, line 2, "the" should read --said--.
Column 11, line 25, "that" should read --wherein--.
Column 11, line 41, the first occurrence of "in" should read --is--.
Column 11, line 65, "having" should read --has--.
Column 12, line 41, "therein" should read --therein,--.
Column 12, line 56, "are" should read --is--.
Column 12, line 61, "cross section" should read --cross-section--.
Column 14, lines 11-12, "transform" should read --transforms--.
Column 14, line 17, "ot" should read --of--.

Signed and Sealed this

Twenty-ninth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

PATENT NO. : 6,144,480
DATED : November 7, 2000
INVENTOR(S) : Li et al.

It is certified that error appears in the above-identified patent and that said Letters Patent is hereby corrected as shown below:

Title page,
Item [57], ABSTRACT,
Line 5, "cells" should read -- cell --.

Column 1,
Line 55, "so" should read -- So --.
Line 60, "do" should read -- does --.

Column 2,
Line 51, "belong" should read -- belongs --.
Line 55, "a" should read -- an --.

Column 3,
Line 11, after "in" insert --a --.
Line 24, "do" should read -- does --.
Line 30, "a" should read -- an --.
Line 31, "accurately" should read -- accurate --.

Column 4,
Line 21, "is" should read -- are --.
Line 35, "shows" should read -- show --.

Column 6,
Line 55, "receives" should read -- receive --.
Line 67, "satisfies" should read -- satisfy --.

Column 7,
Line 59, "belong" should read -- belongs --.
Line 61, "obtain for instance" should read -- obtain, for instance, --.
Line 65, "a" should read -- an --.

Column 8,
Line 1, "instance" should read -- instance, --.
Lines 6 and 13, "an" should read -- a --.

Column 9,
Line 26, "an" should read -- a --.

UNITED STATES PATENT AND TRADEMARK OFFICE
CERTIFICATE OF CORRECTION

PATENT NO. : 6,144,480
DATED : November 7, 2000
INVENTOR(S) : Li et al.

It is certified that error appears in the above-identified patent and that said Letters Patent is hereby corrected as shown below:

Column 10,
Line 9, after "multiplexer,", delete "which".
Line 18, after "divider,", delete "which".
Line 24, after "analyzer,". delete "which".
Line 32, delete "which through the arrangement".
Line 36, after "by", delete "a".
Line 43, "transforms" should read -- transform --.

Column 11,
Line 2. "the" should read -- said --.
Line 25, "that" should read -- wherein --.
Line 41, the first occurrence of "in" should read -- is --.
Line 65, "having" should read -- has --.

Column 12,
Line 41, "therein" should read -- therein, --.
Line 56, "are" should read -- is --.
Line 61, "cross section" should read -- cross-section --.

Column 14,
Lines 11-12, "transform" should read -- transforms --.
Line 17. "ot" should read -- of --.

This certificate supersedes Certificate of Correction issued May 29, 2001.

Signed and Sealed this

Eleventh Day of May, 2004

JON W. DUDAS
*Acting Director of the United States Patent and Trademark Office*